(12) United States Patent
Kameyama et al.

(10) Patent No.: US 9,634,323 B2
(45) Date of Patent: Apr. 25, 2017

(54) ELECTRODE, METAL-AIR BATTERY, AND ELECTRODE MANUFACTURING METHOD

(71) Applicant: HITACHI ZOSEN CORPORATION, Osaka (JP)

(72) Inventors: Kazuya Kameyama, Osaka (JP); Masanobu Aizawa, Osaka (JP)

(73) Assignee: HITACHI ZOSEN CORPORATION (JP)

( * ) Notice: Subject to any disclaimer, the term of this patent is extended or adjusted under 35 U.S.C. 154(b) by 11 days.

(21) Appl. No.: 14/761,459

(22) PCT Filed: Jan. 9, 2014

(86) PCT No.: PCT/JP2014/000057
§ 371 (c)(1),
(2) Date: Jul. 16, 2015

(87) PCT Pub. No.: WO2014/112335
PCT Pub. Date: Jul. 24, 2014

(65) Prior Publication Data
US 2015/0372297 A1    Dec. 24, 2015

(30) Foreign Application Priority Data

Jan. 18, 2013  (JP) .................................. 2013-007248

(51) Int. Cl.
*H01M 4/00*    (2006.01)
*H01M 4/38*    (2006.01)
(Continued)

(52) U.S. Cl.
CPC ........... *H01M 4/38* (2013.01); *H01M 4/0404* (2013.01); *H01M 4/045* (2013.01);
(Continued)

(58) Field of Classification Search
CPC .......... H01M 12/08; H01M 2004/025; H01M 2300/0014; H01M 2/36; H01M 2/40;
(Continued)

(56) References Cited

U.S. PATENT DOCUMENTS 4,007,054 A * 2/1977 Marincic ................. H01M 4/06
429/206
4,842,963 A    6/1989 Ross, Jr. ......................... 429/21
(Continued)

FOREIGN PATENT DOCUMENTS

GB    1 256 419    12/1971
GB    1 517 134    7/1978
(Continued)

Primary Examiner — Patrick Ryan
Assistant Examiner — Ben Lewis
(74) Attorney, Agent, or Firm — Ostrolenk Faber LLP

(57) ABSTRACT

A metal-air battery (1) includes a negative electrode (3), a positive electrode (2), and an electrolyte layer (4) disposed between the negative electrode (3) and the positive electrode (2). The negative electrode (3) includes a base member (31) which has a coiled shape and is formed of a conductive material and a deposited metal layer (32) in powder or particle state, which is formed on a surface of the base member (31) by electrolytic deposition. The electrolyte layer (4) contains an alkaline aqueous solution which contains the same metal as the deposited metal layer (32), and the positive electrode (2) has a tubular shape which is concentric with the negative electrode (3) having the coiled shape and surrounds the negative electrode (3). In this metal-air battery (1), it is possible to suppress occurrence of dendrites in the negative electrode (3).

6 Claims, 7 Drawing Sheets

(51) Int. Cl.
*H01M 4/04* (2006.01)
*H01M 4/66* (2006.01)
*H01M 4/78* (2006.01)
*H01M 12/08* (2006.01)
*H01M 2/36* (2006.01)
*H01M 2/40* (2006.01)
*H01M 4/02* (2006.01)

(52) U.S. Cl.
CPC ......... *H01M 4/0452* (2013.01); *H01M 4/661* (2013.01); *H01M 4/78* (2013.01); *H01M 12/08* (2013.01); *H01M 2/36* (2013.01); *H01M 2/40* (2013.01); *H01M 2004/025* (2013.01); *H01M 2300/0014* (2013.01); *Y02E 60/128* (2013.01)

(58) Field of Classification Search
CPC .. H01M 4/0404; H01M 4/045; H01M 4/0452; H01M 4/38; H01M 4/661; H01M 4/78; Y02E 60/124
See application file for complete search history.

(56) References Cited

U.S. PATENT DOCUMENTS

| | | | |
|---|---|---|---|
| 4,968,569 A | 11/1990 | Chiba et al. | 429/229 |
| 5,958,210 A | 9/1999 | Siu et al. | 205/602 |
| 6,432,292 B1 | 8/2002 | Pinto et al. | 205/145 |
| 2012/0313587 A1 | 12/2012 | Norton et al. | 320/128 |
| 2015/0140383 A1 | 5/2015 | Kwon et al. | 429/94 |

FOREIGN PATENT DOCUMENTS

| | | |
|---|---|---|
| JP | 07-220726 | 8/1995 |
| JP | 2008-262810 A | 10/2008 |
| WO | WO 2010/052336 A1 | 5/2010 |
| WO | WO 2012/165913 A2 | 12/2012 |

* cited by examiner

… (1) …

ELECTRODE, METAL-AIR BATTERY, AND ELECTRODE MANUFACTURING METHOD

CROSS-REFERENCE TO RELATED APPLICATIONS

The present application is a 35 U.S.C. §§371 national phase conversion of PCT/JP2014/000057, filed Jan. 9, 2014, which claims priority to Japanese Patent Application No. 2013-007248, filed Jan. 18, 2013, the contents of both of which are incorporated herein by reference. The PCT International Application was published in the English language.

TECHNICAL FIELD

The present invention relates to an electrode, a metal-air battery, and an electrode manufacturing method.

BACKGROUND ART

Conventionally, known are metal-air batteries that each use a metal as an active material of a negative electrode and oxygen in the air as an active material of a positive electrode. International Publication No. WO 2010/052336 (Document 1), for example, discloses a rechargeable zinc-air battery. It is described that in this battery, an anode includes essentially-spherical copper particles coated by a layer of zinc, and it is thereby possible to successfully charge the battery.

Incidentally, in secondary batteries such as metal-air batteries or the like, there is a possibility of causing a short circuit between the positive electrode and the negative electrode by occurrence of dendrites in which the metal is locally deposited on the negative electrode during charge. In the technique of Document 1, it is uncertain whether or not the occurrence of dendrites is suppressed.

SUMMARY OF INVENTION

The present invention is intended for an electrode used as a negative electrode in a secondary battery, and it is an object of the present invention to suppress the occurrence of dendrites.

The electrode according to the present invention includes a base member having a coiled shape, formed of a conductive material, and a deposited metal layer in powder or particle state, which is formed on a surface of the base member by electrolytic deposition. According to the present invention, it is possible to suppress the occurrence of dendrites.

In a preferred embodiment of the present invention, the deposited metal layer is formed of zinc. In this case, it is preferable that a density of the deposited metal layer is not lower than 2.10 g/cm$^3$ and not higher than 6.40 g/cm$^3$.

In another preferred embodiment of the present invention, the base member contains copper or copper alloy. It is thereby possible to increase the electric conductivity of the base member which also serves as a current collector.

The present invention is also intended for a metal-air battery. The metal-air battery according to the present invention includes a negative electrode which is the above-described electrode, a positive electrode, and an electrolyte layer disposed between the negative electrode and the positive electrode. It is thereby possible to suppress the occurrence of dendrites in the negative electrode.

Preferably, in the metal-air battery, the electrolyte layer contains an alkaline aqueous solution which contains the same metal as the deposited metal layer, and the positive electrode has a tubular shape which is concentric with the negative electrode having a coiled shape and surrounds the negative electrode.

The present invention is still also intended for an electrode manufacturing method of manufacturing an electrode used as a negative electrode in a secondary battery. The electrode manufacturing method according to the present invention includes preparing a base member having a coiled shape, formed of a conductive material, and forming a deposited metal layer in powder or particle state on a surface of the base member by performing electrolytic deposition on the base member with an opposite electrode which surrounds the base member and has a tubular shape concentric with the base member in an alkaline aqueous solution containing a metal. It is thereby possible to manufacture an electrode capable of suppressing the occurrence of dendrites.

These and other objects, features, aspects and advantages of the present invention will become more apparent from the following detailed description of the present invention when taken in conjunction with the accompanying drawings.

DESCRIPTION OF EMBODIMENTS

Figure 1:
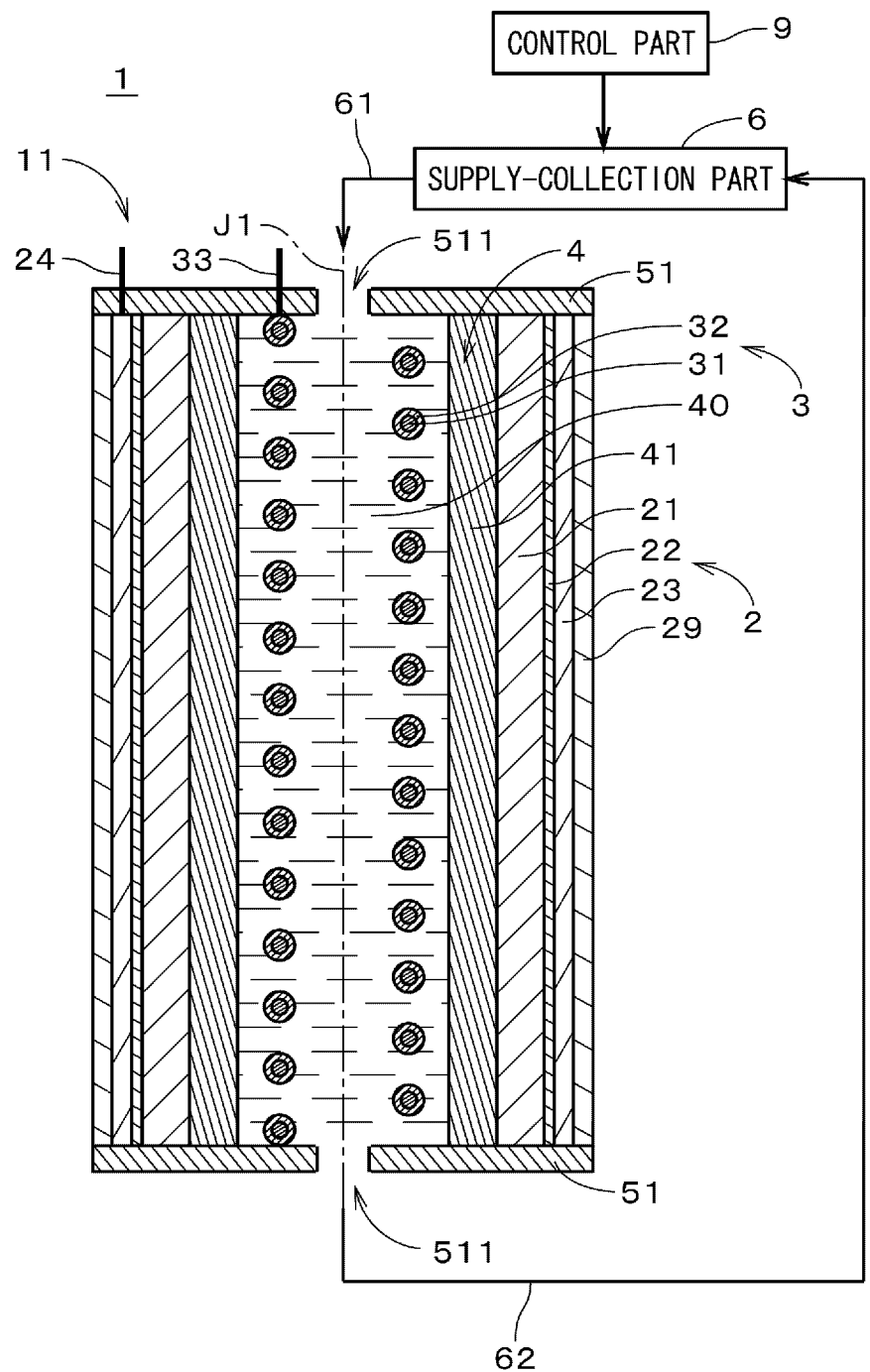
FIG. 1 is a view showing a configuration of a metal-air battery.

FIG. 1 is a view showing a configuration of a metal-air battery 1 in accordance with one embodiment of the present invention. A main body 11 of the metal-air battery 1 has a substantially cylindrical shape about a central axis J1, and FIG. 1 shows a cross section of the main body 11 including the central axis J1. The metal-air battery 1 is a secondary battery which includes a positive electrode 2, a negative electrode 3, and an electrolyte layer 4.

Figure 2:
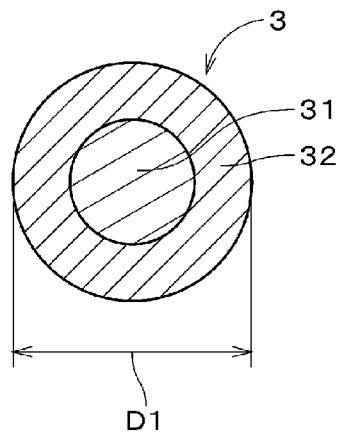
FIG. 2 is a view showing a cross section of a negative electrode.
Figure 4:
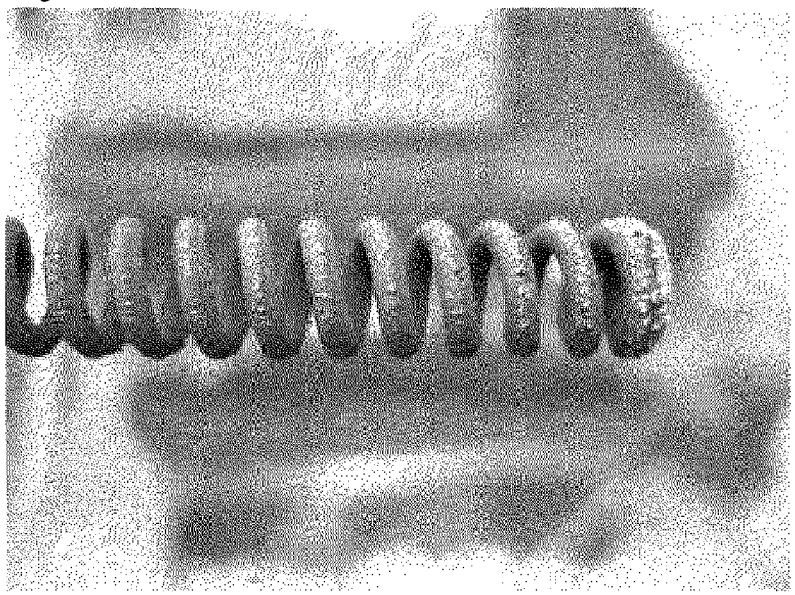
FIG. 4 is a photograph showing a coiled electrode.
Figure 5:
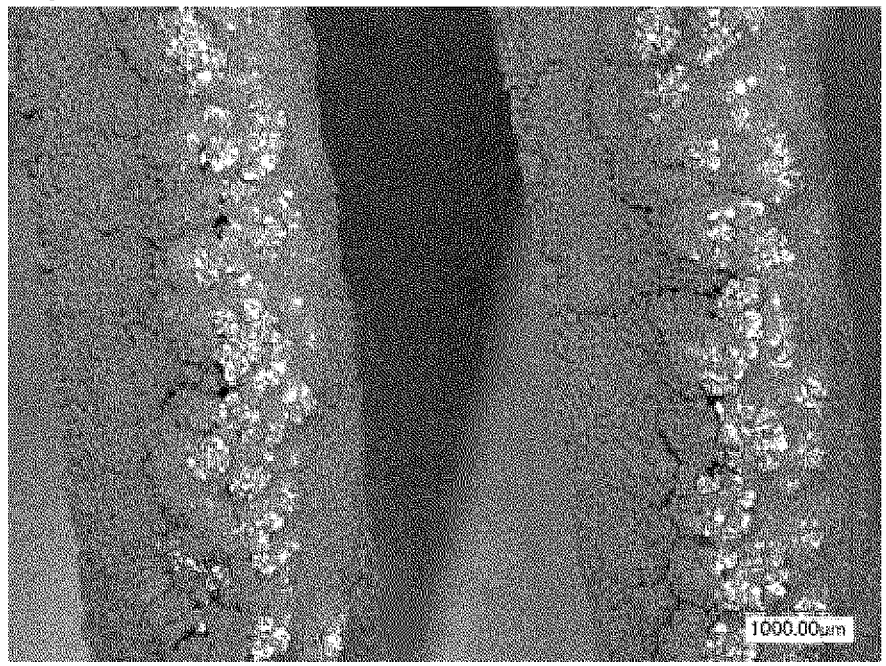
FIG. 5 is a photograph showing a surface state of the coiled electrode.
Figure 6:
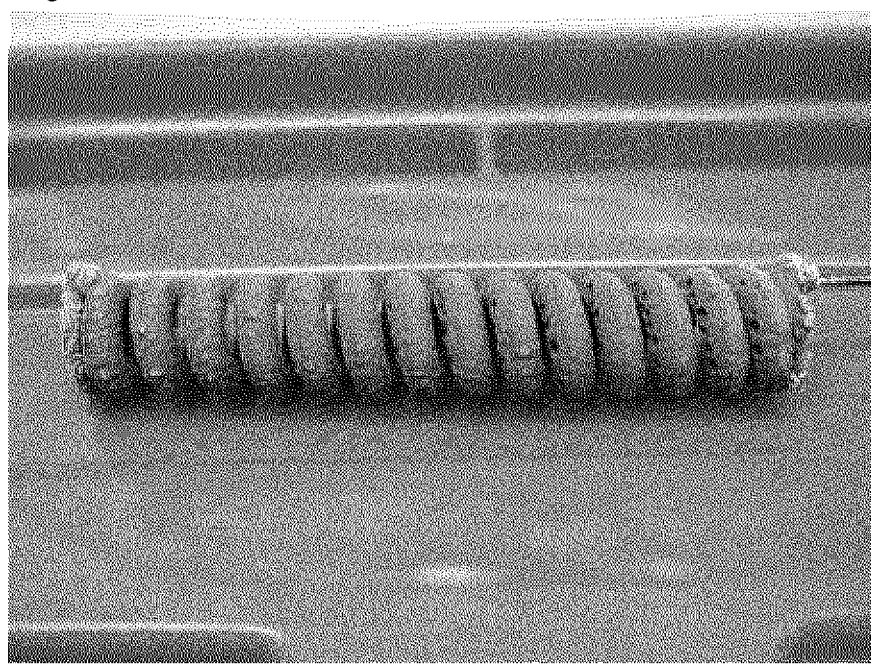
FIG. 6 is a photograph showing the coiled electrode.

The negative electrode 3 (also referred to as "metal electrode") is a coiled member about the central axis J1 (see FIGS. 4 and 6 discussed later). The negative electrode 3 of the present embodiment has a shape in which a linear member having a substantially circular cross section is wound in a spiral manner about the central axis J1. As shown in FIG. 2 showing an enlarged cross section and FIG. 1, the negative electrode 3 includes a coiled base member 31 formed of a conductive material and a deposited metal layer 32 (see FIGS. 5 and 7 discussed later) in powder or particle state, which is formed on a surface of the base member 31. As shown in FIG. 1, a negative electrode current collector terminal 33 is connected to an end of the negative electrode 3 in a direction of the central axis J1.

As an exemplary material of which the negative electrode 3 is formed, metal such as copper (Cu), nickel (Ni), silver (Ag), gold (Au), iron (Fe), aluminum (Al), magnesium (Mg), or the like, or an alloy containing any one of the above metals may be used. In the present embodiment, the base member 31 is formed of copper. It is preferable that the base member 31 should contain copper or copper alloy in terms of an increase in the electric conductivity of the base member 31 which also serves as a current collector. When a main body of the base member 31 is formed of copper, for a reason discussed later, it is preferable that a protection film of another metal such as nickel, zinc, or the like should be formed on a surface of the main body. In this case, the surface of the base member 31 is a surface of the protection film. The protection film, for example, has a thickness of 1 to 20 micrometers and is formed by plating. As discussed later, the deposited metal layer 32 is formed by electrolytic deposition of zinc (Zn). The deposited metal layer 32 may be formed by electrolytic deposition of any metal other than zinc. Detailed discussion on the deposited metal layer 32 will be made later.

A cylindrical separator 41 is provided around the negative electrode 3, and the positive electrode 2 having a cylindrical shape is provided around the separator 41. Specifically, an inner surface of the separator 41 faces the negative electrode 3 and an outer surface of the separator 41 faces the positive electrode 2. The negative electrode 3, the separator 41, and the positive electrode 2 are provided concentrically about the central axis J1, and when seen along the central axis J1, the distance between an outer edge of the negative electrode 3 and the positive electrode 2 is constant all around the circumference in a circumferential direction about the central axis J1. In other words, between the negative electrode 3 and the positive electrode 2 in the metal-air battery 1, all around the circumference in the circumferential direction, the interval of an equipotential surface is constant (there is not sparse or dense in the interval) and a uniform distribution of current appears. Only if the distribution of current all around the circumference in the circumferential direction can be taken as almost uniform, the positive electrode 2 may have a regular polygonal (e.g., with six or more vertexes) tubular shape.

The separator 41 is an ion exchange membrane formed of, for example, a resin such as polyimide or the like. In the metal-air battery 1 in which the separator 41 is formed of a resin, it is possible to reduce the thickness of the separator 41 and thereby reduce the electric resistance between the negative electrode 3 and the positive electrode 2. It is further possible to reduce the weight of the metal-air battery 1. Depending on the design of the metal-air battery 1, the separator 41 may be formed of other material such as ceramic or the like.

A space inside the tubular positive electrode 2 (on the side of the central axis J1) is filled with an aqueous electrolyte solution 40. Almost the whole of the negative electrode 3 is immersed in the electrolyte solution 40. Pores of the separator 41 which is a porous member are also filled with the electrolyte solution 40. In the following discussion, a space between the negative electrode 3 and the positive electrode 2 as seen along the central axis J1 is referred to as an "electrolyte layer 4". In other words, the electrolyte layer 4 is a space disposed between the negative electrode 3 and the positive electrode 2. In the present embodiment, the electrolyte layer 4 includes the separator 41.

The electrolyte solution 40 is an alkaline aqueous solution, and preferably contains a potassium hydroxide (caustic potash, KOH) solution or a sodium hydroxide (caustic soda, NaOH) solution. When the electrolyte solution 40 contains the potassium hydroxide solution, a concentration of potassium hydroxide is, for example, 224 to 561 g per 1 liter (i.e., 224 to 561 g/L). When the electrolyte solution 40 contains the sodium hydroxide solution, a concentration of sodium hydroxide is, for example, 160 to 400 g/L. Further, it is preferable that the electrolyte solution 40 should contain zinc oxide in high concentration. For example, the concentration of the zinc oxide is 10 to 120 g/L, and more preferably, 50 to 120 g/L. In this case, the electrolyte solution 40 contains the same metal as the deposited metal layer 32. Furthermore, the electrolyte solution 40 may be any other aqueous electrolyte solution or a nonaqueous (e.g., organic solvent) electrolyte solution.

The positive electrode 2 (also referred to as "air electrode") includes a porous positive electrode conductive layer 21. A positive electrode catalyst is supported on an outer surface of the positive electrode conductive layer 21, forming a positive electrode catalyst layer 22. Around the positive electrode catalyst layer 22, for example, a mesh sheet of metal such as nickel or the like is wound, thereby forming a current collector layer 23, and a positive electrode current collector terminal 24 is connected to an end of the current collector layer 23 in the direction of the central axis J1. Since the positive electrode catalyst is actually dispersed in the vicinity of the outer surface of the positive electrode conductive layer 21 and is not formed as a definite layer, the current collector layer 23 is also connected partially to the outer surface of the positive electrode conductive layer 21. Further, an interconnector which is in contact only with part of the outer surface of the positive electrode conductive layer 21 may be provided as the current collector layer 23.

On an outer surface of the current collector layer 23 (including a portion of the outer surface of the positive electrode catalyst layer 22 which is not covered with the mesh-like current collector layer 23), a porous layer formed of a material with liquid repellency (for example, PFA (perfluoro alkoxy alkane) or PTFE (polytetrafluoroethylene)) is formed as a liquid repellent layer 29.

In terms of preventing deterioration due to oxidation during charge discussed later, it is preferable that the positive electrode conductive layer 21 does not contain carbon, and in the present embodiment, the positive electrode conductive layer 21 is a thin porous conductive film formed mainly of a perovskite type oxide (for example, LSMF ($LaSrMnFeO_3$)) having conductivity.

Further, the positive electrode catalyst layer 22 is formed of a catalyst which promotes an oxidation-reduction reaction, and for example, an oxide of metal such as manganese (Mn), nickel (Ni), cobalt (Co), or the like may be used as the catalyst. In the present embodiment, the positive electrode catalyst layer 22 is formed of manganese dioxide ($MnO_2$) which is preferentially supported on the positive electrode conductive layer 21. In the metal-air battery 1, in principle, an interface between air and the electrolyte solution 40 is formed in the vicinity of the porous positive electrode catalyst layer 22.

As shown in FIG. 1, disk-like closing members 51 are fixed on both end surfaces (an upper end surface and a lower end surface in FIG. 1) of the negative electrode 3, the electrolyte layer 4, and the positive electrode 2 in the direction of the central axis J1. A through hole 511 is provided in the center of each of the closing members 51. In the metal-air battery 1, the liquid repellent layer 29 and the closing members 51 serve to prevent the electrolyte solution 40 in the main body 11 from leaking out to the outside other than through the through holes 511.

One end of a supply pipe 61 is connected to the through hole 511 of one of the closing members 51, and the other end of the supply pipe 61 is connected to a supply-collection part 6. Further, one end of a collection pipe 62 is connected to the through hole 511 of the other closing member 51, and the other end of the collection pipe 62 is connected to the supply-collection part 6. The supply-collection part 6 has a pump and a reservoir tank for storing an electrolyte solution, and is capable of collecting the electrolyte solution 40 contained in the main body 11 into the reservoir tank at a flow rate (volume per unit time) instructed by a control part 9 and supplying the electrolyte solution in the reservoir tank to the main body 11 at the same flow rate. In other words, the electrolyte solution can be circulated between the main body 11 and the reservoir tank of the supply-collection part 6. The supply-collection part 6 is provided with a filter, and during circulation of the electrolyte solution, unnecessary substances contained in the electrolyte solution are removed with the filter.

In the metal-air battery 1 of the present embodiment, the central axis J1 of the main body 11 is parallel to a vertical direction (direction of gravity), and the through hole 511 connected to the collection pipe 62 is positioned lower than the through hole 511 connected to the supply pipe 61 in the vertical direction. Further, the supply pipe 61 and the collection pipe 62 are provided with a supply valve and a collection valve (both not shown), respectively. In the present exemplary operation, the electrolyte solution is circulated at a constant flow velocity during a normal operation. The supply valve and the collection valve can be taken as part of the supply-collection part 6. It is not always necessary for the central axis J1 of the metal-air battery 1 to be parallel to the vertical direction, and the metal-air battery 1 may be arranged, for example, so that the central axis J1 may be parallel to a horizontal direction.

When the metal-air battery 1 of FIG. 1 is discharged, the negative electrode current collector terminal 33 and the positive electrode current collector terminal 24 are electrically connected to each other via a load (e.g., a lighting equipment or the like). The metal contained in the negative electrode 3 is oxidized into metal ions (in this case, zinc ions ($Zn^{2+}$)), and electrons are supplied to the positive electrode 2 through the negative electrode current collector terminal 33, the load, and the positive electrode current collector terminal 24. In the porous positive electrode 2, oxygen in the air transmitted through the liquid repellent layer 29 is reduced by the electrons supplied from the negative electrode 3 into hydroxide ions ($OH^-$) (or oxygen ions ($O^{2-}$)).

The deposited metal layer 32 in powder or particle state has a surface area which is significantly larger than that in a case where the negative electrode has a smooth surface. Therefore, the interface resistance in the negative electrode 3 becomes lower and a discharge reaction proceeds at low voltage. Further, in the metal-air battery 1, since the entire negative electrode 3 is in uniform contact with the electrolyte solution 40, the deposited metal layer 32 is uniformly eluted. Actually, zinc is eluted into the electrolyte solution 40 as zincate ions. The condition of elution of the deposited metal layer 32 can be checked by taking out the negative electrode 3 during or after discharge and observing the negative electrode 3 with an optical microscope or an electron microscope.

Incidentally, in a case where the surface of the base member 31 is copper and the electrolyte solution 40 which is an alkaline aqueous solution contains oxygen, if the discharge is continued while no deposited metal layer 32 remains (overdischarge), the surface of the base member 31 (copper) is dissolved while being oxidized. Therefore, when the main body of the base member 31 is formed of copper, by forming a protection film of other metal (nickel or the like) on the surface of the main body thereof, it is possible to suppress corrosion of the base member 31 during overdishcarge.

On the other hand, when the metal-air battery 1 is charged, a voltage is applied between the negative electrode current collector terminal 33 and the positive electrode current collector terminal 24, and in the positive electrode 2, electrons are supplied from the hydroxide ions to the positive electrode current collector terminal 24 through the current collector layer 23 and oxygen is thereby produced. In the negative electrode 3, the metal ions are reduced by the electrons supplied to the negative electrode current collector terminal 33, and a metal (zinc in this case) is deposited on the surface thereof.

At that time, in the coiled negative electrode 3, since the negative electrode 3 has no corner portion, an electric field concentration is hard to occur (there is no large bias in the current density). Further, the negative electrode 3 is in uniform contact with the electrolyte solution 40. As a result, it is possible to significantly suppress generation and growth of dendrites in which the metal is dendritically deposited. Actually, over almost entire surface of the negative electrode 3, the metal in powder or particle state is uniformly deposited and the deposited metal layer 32 in powder or particle state is thereby formed (or the deposited metal layer 32 is thickened). In the positive electrode 2, since the generation of oxygen is accelerated by the positive electrode catalyst included in the positive electrode catalyst layer 22, overvoltage decreases, and accordingly a charge voltage of the metal-air battery 1 can be reduced. The condition of the occurrence of the dendrites can be checked by taking out the negative electrode 3 after charge and observing the negative electrode 3 with an optical microscope or an electron microscope.

As discussed earlier, in the metal-air battery 1, the electrolyte solution is circulated by the supply-collection part 6 and the electrolyte solution 40 in the vicinity of the through hole 511 positioned lower (hereinafter, referred to also as a "lower through hole 511") is collected from the lower through hole 511. Further, some of the electrolyte solution 40 supplied into the main body 11 from the through hole 511 positioned upper (hereinafter, referred to also as an "upper through hole 511") is diffused also in (the separator 41 of) the electrolyte layer 4 through clearances of the coiled negative electrode 3 (gaps between circular portions located away from one another in a longitudinal direction of the cross section of the negative electrode 3 shown in FIG. 1). The electrolyte solution 40 contained in the electrolyte layer 4 is thereby replaced by the electrolyte solution in the reservoir tank of the supply-collection part 6 while the metal-air battery 1 is discharged or charged. Since the electrolyte solution 40 in the main body 11 is stirred to some degree with the flow of the electrolyte solution 40 from the upper through hole 511 toward the lower through hole 511, the eluted zincate ions can be immediately moved away from the vicinity of the negative electrode 3 during discharge, and it is thereby possible to suppress deterioration in the battery performance due to generation of a passivation film in the negative electrode 3. Further, it is preferable that the electrolyte solution in the reservoir tank of the supply-collection part 6 should contain zinc in high concentration. In the reservoir tank, the electrolyte solution is heated as necessary.

In the metal-air battery 1, sequential operations of collecting a predetermined amount of electrolyte solution from the lower through hole 511 and supplying the same amount of electrolyte solution from the upper through hole 511 may be repeated. The electrolyte solution 40 in the main body 11 is thereby replaced by the electrolyte solution in the reservoir tank of the supply-collection part 6 while the metal-air battery 1 is discharged or charged. Further, replacement of the electrolyte solution may be intermittently performed. For example, after the electrolyte solution is circulated for a predetermined time period, by closing the supply valve and the collection valve, collection and supply of the electrolyte solution is stopped until diffusion of new electrolyte solution becomes an equilibrium state. Exchange of the electrolyte solution 40 in the main body 11 (mixture of deteriorated electrolyte solution and new electrolyte solution) is performed while the metal-air battery 1 is discharged or charged. As a matter of course, the exchange of the electrolyte solution 40 in the main body 11 may be performed while the discharge or charge is stopped.

As discussed above, in the metal-air battery 1 of FIG. 1, the coiled negative electrode 3 is used, and the deposited metal layer 32 in powder or particle state is formed on the surface of the negative electrode 3 during charge. It is thereby possible to suppress the occurrence of the dendrites in the negative electrode 3. As a result, it is possible to prevent the short circuit between the positive electrode 2 and the negative electrode 3 from being caused when the dendrites grow up to penetrate the separator 41. Further, in the negative electrode 3 having the deposited metal layer 32 in powder or particle state, it is possible to reduce the interface resistance during discharge.

In the coiled negative electrode 3, as compared with in a tubular negative electrode, it is possible to easily increase the amount of supported zinc per unit volume. Further, since a space on the inner side of the negative electrode 3 (on the side of the central axis J1) and a space on the outer side thereof communicate with each other, it is possible to extremely increase the liquid permeability between the inner-side space and the electrolyte layer 4, as compared with in a tubular negative electrode. As a result, in the metal-air battery 1 which uses the space on the inner side of the negative electrode 3 as a passage of the electrolyte solution 40, it is possible to achieve easy replacement of the electrolyte solution 40 contained in the electrolyte layer 4.

Next, discussion will be made on a manufacture of an electrode used as the negative electrode 3 in the metal-air battery 1. In an electrode manufacturing apparatus used for manufacturing the electrode, a tubular opposite electrode is provided in a predetermined electrolytic deposition bath, like the positive electrode 2 in the above-discussed metal-air battery 1. Further, in the electrolytic deposition bath, an electrolyte solution which is an alkaline aqueous solution is pooled. Preferably, the electrolyte solution contains a potassium hydroxide solution or a sodium hydroxide solution. When the electrolyte solution contains the potassium hydroxide solution, a concentration of potassium hydroxide is, for example, 224 to 561 g/L, and when the electrolyte solution contains the sodium hydroxide solution, a concentration of sodium hydroxide is, for example, 160 to 400 g/L. Further, the electrolyte solution contains a metal of which the deposited metal layer 32 in the negative electrode 3 is formed. In this case, the electrolyte solution contains zinc in high concentration, and a concentration of zinc in the electrolyte solution is not lower than 8 g/L and not higher than 90 g/L. The concentration of zinc in the electrolyte solution below 8 g/L may cause a problem that the rate of supply of zinc ions limits the deposition rate, and the concentration of zinc in the electrolyte solution over 90 g/L may cause a problem of the solubility of zinc source of zinc oxide or the like with respect to a concentration of potassium hydroxide to be prepared. It is preferable that a temperature of the electrolyte solution should be not lower than the room temperature (e.g., 23 degrees C.) and not higher than 60 degrees C., and more preferably, not lower than 40 degrees C.

Figure 3:
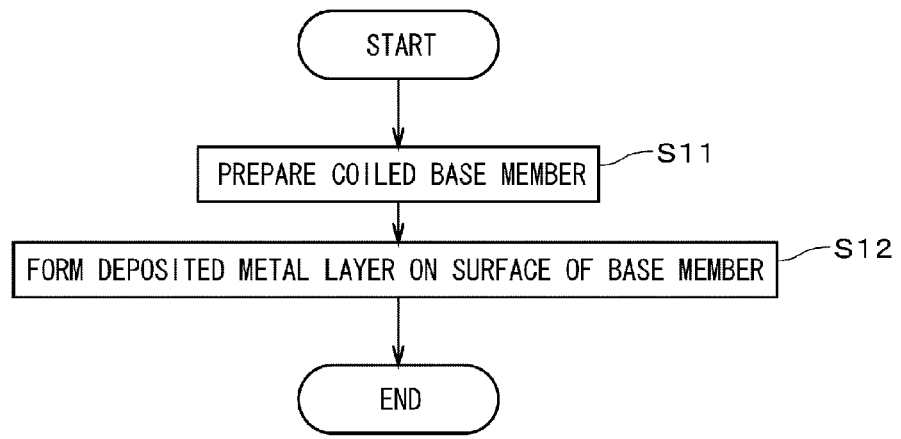
FIG. 3 is a flowchart showing an operation flow for manufacturing an electrode.

FIG. 3 is a flowchart showing an operation flow for manufacturing an electrode. For manufacturing an electrode, first, the coiled base member 31 on which no deposited metal layer 32 is formed is prepared and provided as a working electrode (i.e., an electrode for deposition) in the electrolytic deposition bath of the electrode manufacturing apparatus (Step S11). As discussed earlier, the base member 31 is formed of a conductive material, and preferably, the base member 31 is formed of copper or copper alloy. Further, the surface of the base member 31 may be a surface of a protection film formed of another metal such as nickel, zinc, or the like. The arrangement of the base member 31 and the opposite electrode is the same as that of the negative electrode 3 and the positive electrode 2 in the metal-air battery 1. Specifically, the coiled base member 31 is so disposed inside the opposite electrode as to be concentric with the cylindrical opposite electrode and surrounded by the opposite electrode.

Subsequently, a voltage is applied between the base member 31 and the opposite electrode and electrolytic deposition is performed on the base member 31 for a predetermined time period. On the surface of the base member 31, zinc in powder or particle state is thereby deposited and the deposited metal layer 32 is formed (Step S12). At that time, when the density of the deposited zinc is lower than 2.10 g/cm$^3$ (which corresponds to 30% of the density of zinc, 7.14 g/cm$^3$, under the room temperature), the amount of zinc to be supported on the base member 31 is less and it is not possible to ensure a predetermined discharge time when the electrode is used as the negative electrode 3 in the metal-air battery 1. When the density of the deposited zinc is higher than 6.40 g/cm$^3$ (which corresponds to 90% of the density of zinc, 7.14 g/cm$^3$, under the room temperature), there is a possibility that the zinc cannot be taken as being deposited in powder or particle state (in other words, zinc is taken as being deposited in a dense structure), and the interface resistance during discharge reaction becomes larger. Further, in terms of ensuring a discharge capacity and reducing a manufacturing cost, it is preferable that the current efficiency should be not lower than 60%. Therefore, it is preferable that various conditions should be controlled in the electrode manufacturing process so that the density of the deposited metal layer 32 (zinc layer in this case) can be not lower than 2.10 g/cm$^3$ and not higher than 6.40 g/cm$^3$ and the current efficiency can be not lower than 60%.

The electrode in which the deposited metal layer 32 is formed on the surface of the base member 31 is used as the negative electrode 3 in the metal-air battery 1. The metal-air battery 1 may be taken as an electrode manufacturing apparatus, and in such a case, the coiled base member 31 on which no deposited metal layer 32 is formed is provided as the negative electrode 3. Then, by charging the metal-air battery 1, zinc in powder or particle state is deposited on the surface of the base member 31 and the deposited metal layer 32 is thereby formed.

Thus, in the process of manufacturing the electrode to be used as the negative electrode 3 in the metal-air battery 1, electrolytic deposition is performed on the base member 31 in the alkaline aqueous solution containing a metal, by using the tubular opposite electrode which surrounds the base member 31 having a coiled shape and is concentric with the base member 31. It is thereby possible to form the deposited metal layer 32 in powder or particle state over almost entire surface of the base member 31 without causing any dendrites. Then, by using this coiled electrode as the negative electrode 3 in the metal-air battery 1, it is possible to suppress the occurrence of the dendrites in the metal-air battery 1.

Hereinafter, discussion will be made on Examples 1 to 6 of the electrode manufacturing process shown in FIG. 3 and Comparative Example 1 in which a plate-shaped base member is used as a working electrode.

Example 1

A copper coil having a wire diameter of 1 mm, a pitch of 4 mm, an outer diameter (coil diameter) of 8 mm, and a coil length of 60 mm is prepared as the base member 31 which is a working electrode. Subsequently, in an electrolyte solution in which a concentration of zinc is 41 g/L and a concentration of potassium hydroxide is 449 g/L, an opposite electrode having an octagonal tubular shape (JE-300 made by Permelec Electrode Ltd.) is so disposed as to surround the base member 31. One side of the opposite electrode (one side of a regular octagon) serving as an anode is 28 mm. Electrolytic deposition is performed on the base member 31 with a set current value of 1.71 A (ampere) for two hours while a temperature of the electrolyte solution is set to 40 degrees C. and the electrolyte solution is replenished so that a concentration of zinc in the electrolyte solution can be kept at 40 to 45 g/L. A coiled electrode on which zinc of 2.88 g is supported as the deposited metal layer 32 is thereby obtained, as shown in FIG. 4. By observing a surface state of the coiled electrode with a microscope (VHX-1000 made by Keyence Corporation), it can be confirmed, as shown in FIG. 5, that there occurs no dendrite and a uniform deposited metal layer 32 in powder or particle state (also can be taken as being porous) is formed.

It can be found that the wire diameter (i.e., the size indicated by the arrow D1 in FIG. 2, and an average wire diameter in this case) of the coiled electrode on which the deposited metal layer 32 is deposited is 2.1 mm and the density of the deposited metal layer 32 is 2.96 g/cm³. It can be further found that the current efficiency in the formation of the deposited metal layer 32 is 69%. Herein, current efficiency E can be obtained by $(E=((W1-W0)/R)*100)$, where W0 (g) represents the weight of the electrode before the electrolytic deposition (in other words, the weight of only the base member 31), W1 (g) represents the weight of the electrode after the electrolytic deposition (in other words, the weight of the base member 31 and the deposited metal layer 32), and R represents the theoretical amount of deposited metal discussed later. The theoretical amount of deposited metal R is a value obtained by multiplying the cumulative amount of electricity by the electrochemical equivalent of zinc. The cumulative amount of electricity (Ah) is a value obtained by multiplying the set current value (A) by the time period (h) for the electrolytic deposition, and the electrochemical equivalent of zinc is 1.22 (g/Ah).

Example 2

The base member 31 and the opposite electrode are disposed in the electrolyte solution in the same manner as that in Example 1 except that a concentration of zinc in the electrolyte solution is 8.8 g/L. Then, electrolytic deposition is performed on the base member 31 for two hours under the same condition as that in Example 1 except that a concentration of zinc in the electrolyte solution is kept at 8 to 10 g/L. A coiled electrode on which zinc of 2.95 g is supported as the deposited metal layer 32 is thereby obtained. By observing a surface state of the coiled electrode with the microscope, it can be confirmed that there occurs no dendrite and a uniform deposited metal layer 32 in powder or particle state is formed. It can be found that the wire diameter D1 of the coiled electrode on which the deposited metal layer 32 is deposited is 2.0 mm and the density of the deposited metal layer 32 is 3.45 g/cm³. It can be further found that the current efficiency in the formation of the deposited metal layer 32 is 71%.

Example 3

Electrolytic deposition is performed on the base member 31 under the same condition as that in Example 1 except that a member in which the same copper coil as that in Example 1 is plated with zinc having a thickness of 20 micrometers is used as the base member 31. A coiled electrode on which zinc of 3.00 g is supported as the deposited metal layer 32 is thereby obtained. By observing a surface state of the coiled electrode with the microscope, it can be confirmed that there occurs no dendrite and a uniform deposited metal layer 32 in powder or particle state is formed. It can be found that the wire diameter D1 of the coiled electrode on which the deposited metal layer 32 is deposited is 2.2 mm and the density of the deposited metal layer 32 is 2.74 g/cm³. It can be further found that the current efficiency in the formation of the deposited metal layer 32 is 72%.

Example 4

Electrolytic deposition is performed on the base member 31 under the same condition as that in Example 1 except that a member in which the same copper coil as that in Example 1 is plated with zinc having a thickness of 8 micrometers is used as the base member 31. A coiled electrode on which zinc of 2.91 g is supported as the deposited metal layer 32 is thereby obtained. By observing a surface state of the coiled electrode with the microscope, it can be confirmed that there occurs no dendrite and a uniform deposited metal layer 32 in powder or particle state is formed. It can be found that the wire diameter D1 of the coiled electrode on which the deposited metal layer 32 is deposited is 2.0 mm and the density of the deposited metal layer 32 is 3.40 g/cm³. It can be further found that the current efficiency in the formation of the deposited metal layer 32 is 70%.

Example 5

Figure 7:
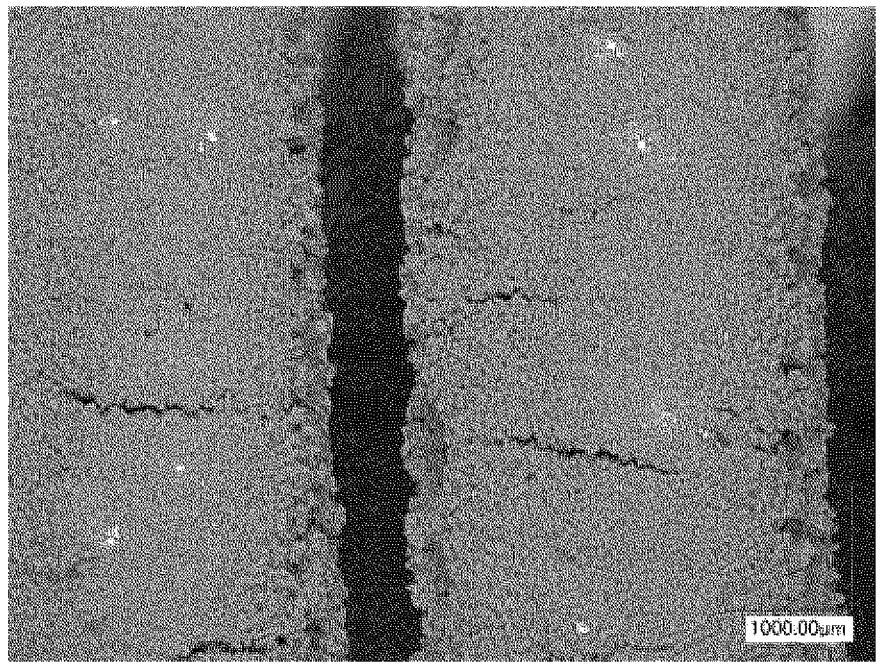
FIG. 7 is a photograph showing a surface state of the coiled electrode.

Electrolytic deposition is performed on the base member 31 under the same condition as that in Example 1 except that a member in which the same copper coil as that in Example 1 is plated with nickel having a thickness of 15 micrometers is used as the base member 31. A coiled electrode on which zinc of 3.00 g is supported as the deposited metal layer 32 is thereby obtained, as shown in FIG. 6. By observing a surface state of the coiled electrode with the microscope, it can be confirmed, as shown in FIG. 7, that there occurs no dendrite and a uniform deposited metal layer 32 in powder or particle state is formed. It can be found that the wire diameter D1 of the coiled electrode on which the deposited metal layer 32 is deposited is 2.2 mm and the density of the deposited metal layer 32 is 2.74 g/cm$^3$. It can be further found that the current efficiency in the formation of the deposited metal layer 32 is 72%.

Example 6

Electrolytic deposition is performed on the base member 31 under the same condition as that in Example 1 except that a member in which the same copper coil as that in Example 1 is plated with nickel having a thickness of 6 micrometers is used as the base member 31. A coiled electrode on which zinc of 3.10 g is supported as the deposited metal layer 32 is thereby obtained. By observing a surface state of the coiled electrode with the microscope, it can be confirmed that there occurs no dendrite and a uniform deposited metal layer 32 in powder or particle state is formed. It can be found that the wire diameter D1 of the coiled electrode on which the deposited metal layer 32 is deposited is 2.2 mm and the density of the deposited metal layer 32 is 2.83 g/cm$^3$. It can be further found that the current efficiency in the formation of the deposited metal layer 32 is 74%.

Comparative Example 1

Figure 8:
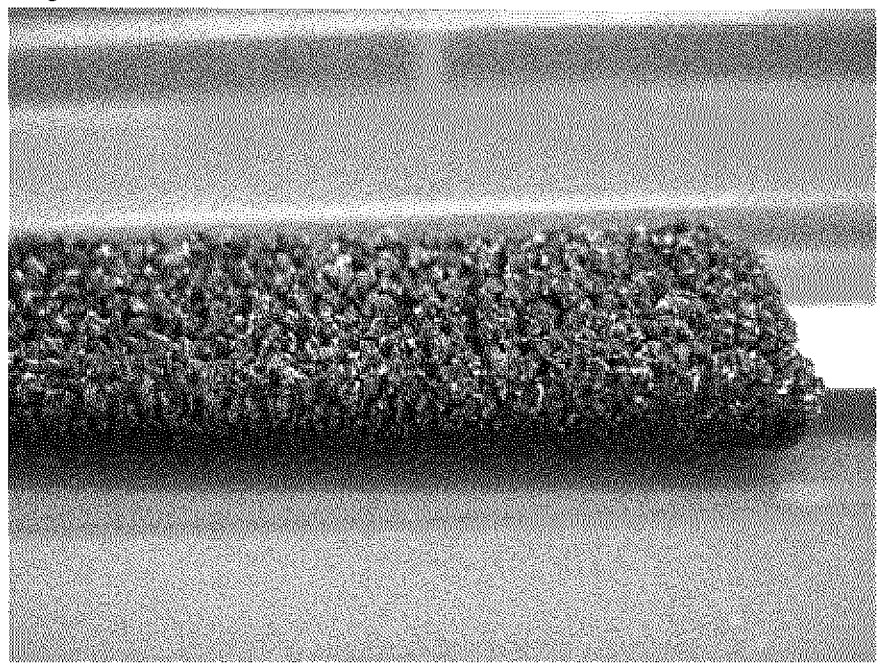
FIG. 8 is a photograph showing a plate-shaped electrode.
Figure 9:
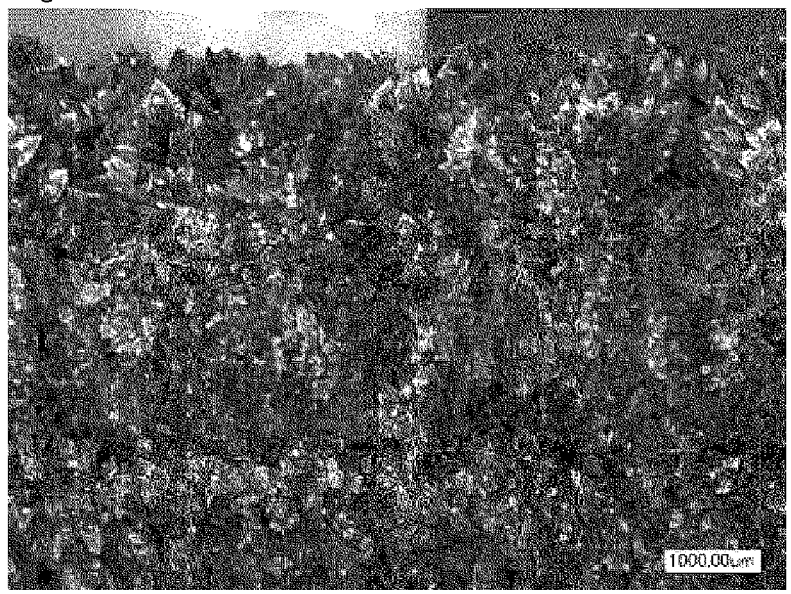
FIG. 9 is a photograph showing a surface state of the plate-shaped electrode.

A copper plate of rectangular shape, 40 mm long and 27 mm wide, having one main surface on which an insulating layer of epoxy resin is formed is prepared as a base member which is a working electrode. Subsequently, in an electrolyte solution in which a concentration of zinc is 8.5 g/L and a concentration of potassium hydroxide is 449 g/L, the same opposite electrode as Example 1 is so disposed as to surround the base member. Electrolytic deposition is performed on the base member with a set current value of 1.62 A for one hour while the temperature of the electrolyte solution is set to 40 degrees C. and the electrolyte solution is replenished so that a concentration of zinc in the electrolyte solution can be kept at 8 to 10 g/L. A plate-shaped electrode on which zinc of 1.03 g is supported is thereby obtained, as shown in FIG. 8. By observing a surface state of the plate-shaped electrode with the microscope, it can be confirmed, as shown in FIG. 9, that there occur dendrites on the entire surface of the base member except the insulating layer. It can be found that the film thickness of the zinc layer in the plate-shaped electrode is 3.6 mm and the density of the zinc layer is 0.26 g/cm$^3$. It can be further found that the current efficiency in the formation of the deposited metal layer 32 is 59%.

(Charge/Discharge Test 1)

A pipe formed of zinc, having an inner diameter of 68 mm, is prepared as a positive electrode (opposite electrode). By using the electrode manufactured in each of Examples 1 to 6 and Comparative Example 1 as a negative electrode, the positive electrode is so disposed as to surround the negative electrode in an electrolyte solution in which a concentration of zinc is 45 g/L and a concentration of potassium hydroxide is 449 g/L. The arrangement of the negative electrode and the positive electrode is the same as that of the negative electrode 3 and the positive electrode 2 in the above-discussed metal-air battery 1. Then, a charge/discharge test is performed with a temperature of the electrolyte solution set to 40 degrees C. and a set current value of 1.71 A during both discharge and charge. In the charge/discharge test, assuming an operation of performing discharge for 50 minutes and then performing charge for 50 minutes as one cycle, 19 cycles of discharge and charge are performed. Only the first discharge immediately after starting the test, however, is performed for two hours (initial discharge time).

The negative electrode after the 19 cycles are completed is observed with the microscope, and the results on whether or not the dendrites occur are shown in Table 1. In Table 1, on the leftmost column, the numbers of Examples (or Comparative Example) for manufacturing the negative electrode are listed, and on the column where "Presence/Absence of Dendrites after Charge/Discharge Test" is seen in the top row, the presence or absence of dendrites after the charge/discharge test in each of Examples and Comparative Example is indicated by "NG" or "OK". The symbol "OK" indicates that it is not found that there occur dendrites and the symbol "NG" indicates that it is found that there occur dendrites. Further, in Table 1, on the column where "Presence/Absence of Dendrites before Charge/Discharge Test" is seen in the top row, the presence or absence of dendrites before the charge/discharge test (in other words, immediately after the manufacture of the electrode in each of Examples and Comparative Example) is indicated by "NG" or "OK", and on the column where "Current Efficiency" is seen in the top row, the above-discussed values of current efficiency are listed. The content on the column where "Passivation Film after Discharge Test" is seen in the top row will be discussed later.

TABLE 1

| | Current Efficiency | Presence/Absence of Dendrites before Charge/Discharge Test | Presence/Absence of Dendrites after Charge/Discharge Test | Passivation Film after Discharge Test |
|---|---|---|---|---|
| Example 1 | 69% | OK | OK | N.D. |
| Example 2 | 71% | OK | OK | N.D. |
| Example 3 | 72% | OK | OK | N.D. |
| Example 4 | 70% | OK | OK | N.D. |
| Example 5 | 72% | OK | OK | N.D. |
| Example 6 | 74% | OK | OK | N.D. |
| Comparative Example 1 | 59% | NG | NG | 5.6% |

As shown in Table 1, in the coiled electrodes in Examples 1 to 6, no (identifiable) dendrite occurs both before and after the charge/discharge test. In other words, in the coiled electrode, the occurrence of the dendrites due to the charge and discharge can be suppressed. On the other hand, in the plate-shaped electrode in Comparative Example 1, there occur dendrites both before and after the charge/discharge test.

Figure 10:
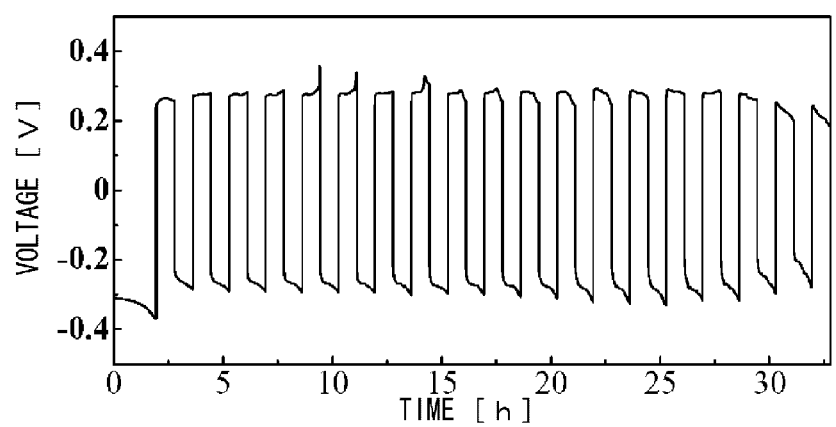
FIG. 10 is a graph showing a change of voltage between both electrodes in a charge/discharge test.

FIG. 10 is a graph showing a change of voltage between both electrodes in this charge/discharge test in the case where the electrode manufactured in Example 3 is used as the negative electrode. In FIG. 10, the reproducibility in the change of voltage is obtained in the repeat of discharge and charge, and it can be seen that stable discharge and charge can be achieved in the coiled electrode. As discussed above, since there occurs no dendrite, the problem that a mass of zinc which is generated as the dendrite may fall off, or the like, does not arise. The same applies to the cases where the respective coiled electrodes manufactured in other Examples are used. Therefore, in the metal-air battery 1 using the coiled electrode manufactured in any one of above Examples as the negative electrode, it is possible to achieve stable discharge and charge.

(Charge/Discharge Test 2)

A copper coil (hereinafter, referred to as a "non-plated copper coil") having a wire diameter of 1 mm, a pitch of 4 mm, an outer diameter (coil diameter) of 8 mm, and a coil length of 60 mm, a member (hereinafter, referred to as a "zinc plated copper coil") in which a surface of the non-plated copper coil is plated with zinc having a thickness of 20 micrometers, a member (hereinafter, referred to as a "nickel plated copper coil") in which the surface of the non-plated copper coil is plated with nickel having a thickness of 15 micrometers, and a copper plate of rectangular shape, 40 mm long and 27 mm wide, are prepared as negative electrodes, respectively. Like in Charge/Discharge Test 1, a positive electrode which is a pipe formed of zinc, having an inner diameter of 68 mm, is so disposed as to surround the negative electrode in the electrolyte solution in which a concentration of zinc is 45 g/L and a concentration of potassium hydroxide is 449 g/L. Then, a charge/discharge test is performed with a temperature of the electrolyte solution set to 40 degrees C. and a set current value of 1.71 A during both discharge and charge. In the charge/discharge test, assuming an operation of performing charge for 50 minutes and then performing discharge for 50 minutes as one cycle, 27 cycles of charge and discharge are performed. Only the first charge immediately after starting the test, however, is performed for 70 minutes (initial charge time).

The negative electrode after the 27 cycles are completed is observed with the microscope, and the results on whether or not the dendrites occur are shown in Table 2. In Table 2, on the column where "Presence/Absence of Dendrites after Charge/Discharge Test" is seen in the top row, the presence or absence of dendrites after the charge/discharge test in each case is indicated by "NG" or "OK".

TABLE 2

| | Presence/Absence of Dendrites after Charge/Discharge Test |
|---|---|
| Non-Plated Copper Coil | OK |
| Zinc Plated Copper Coil | OK |
| Nickel Plated Copper Coil | OK |
| Copper Plate | NG |

As shown in Table 2, in any one of the coiled electrodes, i.e., the non-plated copper coil, the zinc plated copper coil, and the nickel plated copper coil, no dendrite occurs due to the repeat of charge and discharge. On the other hand, in the copper plate which is a plate-shaped electrode, there occur dendrites due to the repeat of charge and discharge (this result can be verified also by a charge/discharge test in which assuming an operation of performing charge for two hours and then performing discharge for two hours as one cycle, 364 cycles of charge and discharge are performed (though the initial charge time is two and a half hours).

Figure 11:
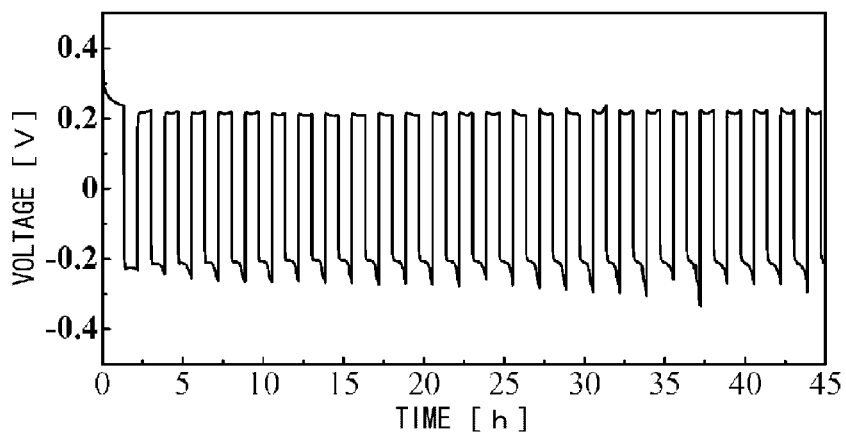
FIG. 11 is a graph showing a change of voltage between both electrodes in the charge/discharge test.

FIG. 11 is a graph showing a change of voltage between both electrodes in this charge/discharge test in the case where the non-plated copper coil is used as the negative electrode. In FIG. 11, the reproducibility in the change of voltage is obtained in the repeat of charge and discharge, and it can be seen that stable charge and discharge can be achieved in the coiled electrode. As discussed above, since there occurs no dendrite, the problem that a mass of zinc which is generated as the dendrite may fall off, or the like, does not arise. The same applies to the cases where the zinc plated copper coil and the nickel plated copper coil are used. Therefore, in the metal-air battery 1, even when the coiled base member 31 on which no deposited metal layer 32 is formed is provided as the negative electrode 3, it is possible to achieve stable charge and discharge.

(Discharge Test)

The electrode manufactured in each of Examples 1 to 6 and Comparative Example 1 is prepared as a negative electrode, and like in Charge/Discharge Test 1, the positive electrode which is the pipe formed of zinc, having an inner diameter of 68 mm, is so disposed as to surround the negative electrode in an electrolyte solution in which a concentration of zinc is 45 g/L and a concentration of potassium hydroxide is 449 g/L. Subsequently, discharge is performed for one hour with a temperature of the electrolyte solution set to 40 degrees C. and a set current value of 1.71 A during discharge. Then, the X-ray diffraction spectrum on a surface of the negative electrode after discharge is measured.

Figure 12:
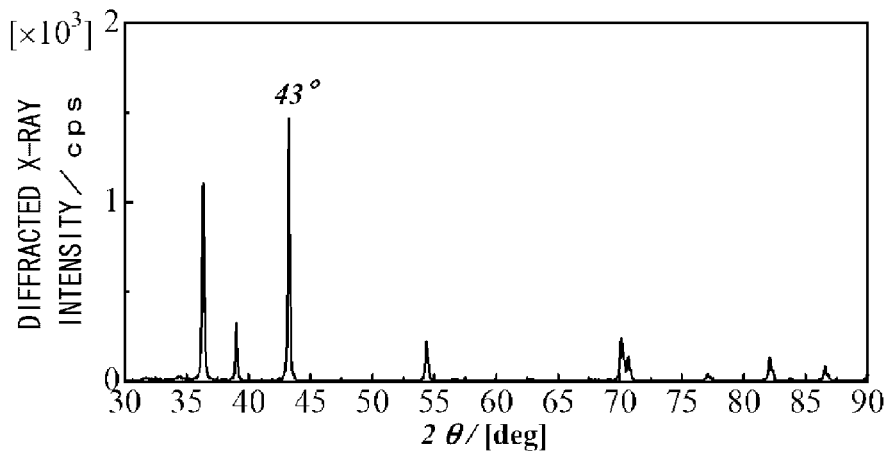
FIG. 12 is a graph showing an X-ray diffraction spectrum on a surface of the coiled electrode after discharge.
Figure 13:
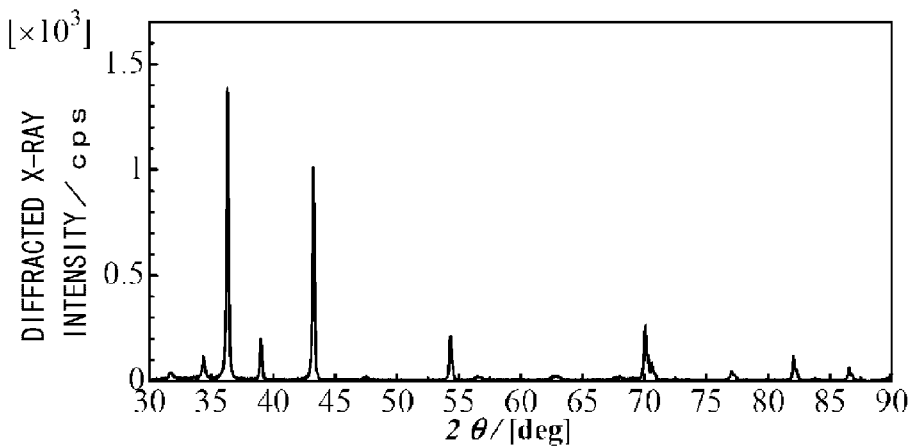
FIG. 13 is a graph showing an X-ray diffraction spectrum on a surface of the plate-shaped electrode after discharge.
Figure 14:
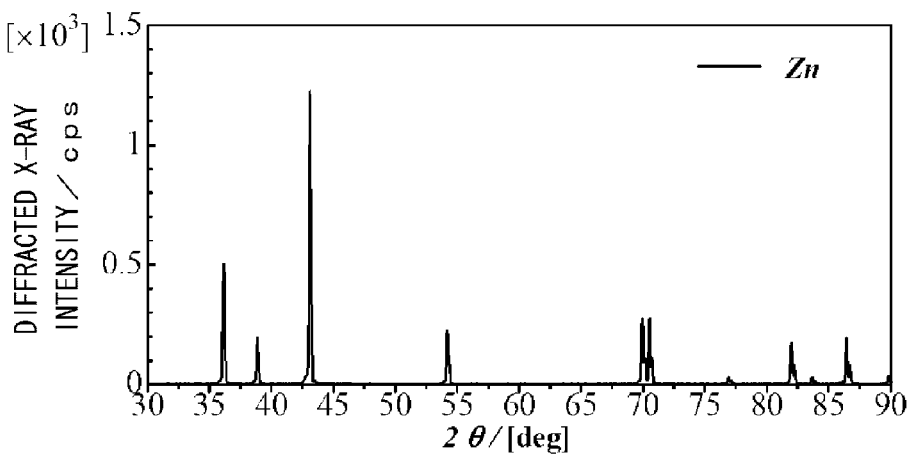
FIG. 14 is a graph showing an X-ray diffraction spectrum of zinc.
Figure 15:
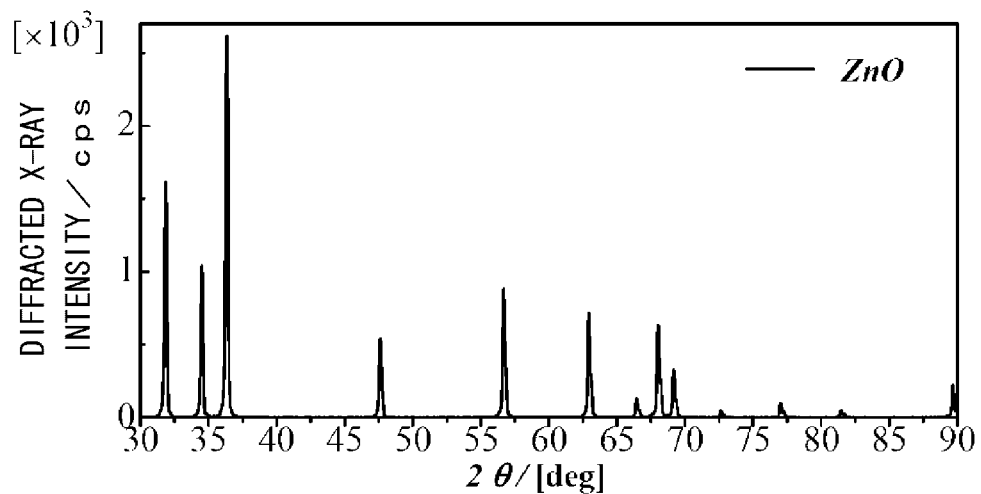
FIG. 15 is a graph showing an X-ray diffraction spectrum of zinc oxide.

FIG. 12 is a graph showing an X-ray diffraction spectrum on the surface of the negative electrode after discharge in a case where the coiled electrode manufactured in Example 3 is used as the negative electrode. FIG. 13 is a graph showing an X-ray diffraction spectrum on the surface of the negative electrode after discharge in the case where the plate-shaped electrode manufactured in Comparative Example 1 is used as the negative electrode. FIG. 14 is a graph showing an X-ray diffraction spectrum of zinc, and FIG. 15 is a graph showing an X-ray diffraction spectrum of zinc oxide. Further, on the column where "Passivation Film after Discharge Test" is seen in the top row in Table 1, listed are values obtained by estimating the content percentage of zinc oxide, which is a passivation film, from the calibration curve based on the spectra. In Table 1, "N.D." represents non-detection of zinc oxide.

From Table 1, it is found that a passivation film is detected after discharge in the plate-shaped electrode of Comparative Example 1, while no passivation film is detected after discharge and generation of passivation film is suppressed in the coiled electrodes of Examples 1 to 6.

Thus, though the metal-air battery and the electrode manufacturing process have been discussed, various variations of the above-discussed metal-air battery and electrode manufacturing process are allowed.

Figure 16:
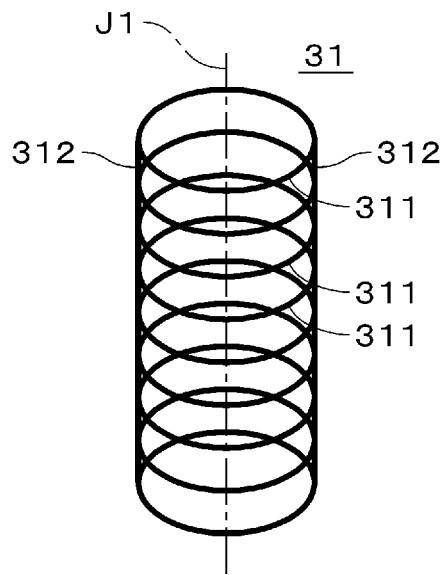
FIG. 16 is a view showing another example of a coiled base member.

Though the coiled base member 31 is typically spiral, as shown in FIG. 16, for example, the base member 31 may have a shape having a plurality of annular members 311 each about the central axis J1 and rod members 312 extending along the central axis J1. In the base member 31 of FIG. 16, the plurality of annular members 311 are arranged along the central axis J1 and supported by the rod members 312. Each of the annular member 311 has a shape in which a linear member having a circular cross section is wound annularly, and the rod member 312 has a shape in which a linear member having a circular cross section extends straightly. Thus, the coiled base member 31 may be achieved in various manners where substantially annular members are arranged along a central axis.

In the metal-air battery 1, it is not always necessary to circulate the electrolyte solution.

The electrode in which the deposited metal layer in powder or particle state is formed on the surface of the coiled base member may be used for any metal-air battery other than the zinc-air battery. Further, the electrode may be used as a negative electrode in any secondary battery other than the metal-air battery. Since the electrode is capable of suppressing the occurrence of the dendrites even when the current density is high, the electrode may be used for various high power secondary batteries.

The configurations of the above-described preferred embodiment and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 Metal-air battery
2 Positive electrode
3 Negative electrode
4 Electrolyte layer
31 Base member
32 Deposited metal layer
40 Electrolyte solution
S11, S12 Step

The invention claimed is:

1. A metal-air battery comprising:
a negative electrode;
a positive electrode; and
an electrolyte layer disposed between said negative electrode and said positive electrode, wherein
said negative electrode comprises:
a base member having a coiled shape, formed of a conductive material; and
an electrolytically deposited metal layer in powder or particle state, which is formed on a surface of said base member by electrolytic deposition,
said electrolyte layer containing an alkaline aqueous solution which contains the same metal as said deposited metal layer, and
said positive electrode having a tubular shape which is concentric with said negative electrode having a coiled shape, and surrounding said negative electrode.

2. A method of manufacturing a negative electrode in a secondary battery, comprising:
preparing a base member having a coiled shape, formed of a conductive material; and
forming a deposited metal layer in powder or particle state on a surface of said base member by performing electrolytic deposition on said base member,
wherein a positive electrode surrounds said base member and has a tubular shape concentric with said base member in an alkaline aqueous solution containing a metal.

3. The electrode manufacturing method according to claim 2, wherein
said metal contained in said alkaline aqueous solution is zinc.

4. The electrode manufacturing method according to claim 3, wherein
a concentration of zinc in said alkaline aqueous solution is not lower than 8 g/L and not higher than 90 g/L.

5. The electrode manufacturing method according to claim 2, wherein
said base member contains copper or copper alloy.

6. The electrode manufacturing method according to claim 2, wherein
said alkaline aqueous solution contains a potassium hydroxide solution or a sodium hydroxide solution.

* * * * *